United States Patent
McReynolds

(10) Patent No.: US 7,346,797 B2
(45) Date of Patent: Mar. 18, 2008

(54) OPTIMUM STABLE COMPOSITE CLOCK NETWORK

(75) Inventor: Stephen R. McReynolds, West Chester, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 391 days.

(21) Appl. No.: 11/216,945

(22) Filed: Aug. 31, 2005

(65) Prior Publication Data

US 2007/0050657 A1 Mar. 1, 2007

(51) Int. Cl.
*G06F 1/00* (2006.01)
*G06F 1/12* (2006.01)
*G06F 1/04* (2006.01)

(52) U.S. Cl. .................. 713/500; 713/400; 713/600

(58) Field of Classification Search .............. 713/500
See application file for complete search history.

(56) References Cited

U.S. PATENT DOCUMENTS 5,796,793 A * 8/1998 Kainulainen ............. 375/356
6,957,358 B1 * 10/2005 Sundaresan et al. ........ 713/600
2002/0094823 A1 * 7/2002 Suzuki et al. .............. 455/456

* cited by examiner

*Primary Examiner*—A. Elamin
*Assistant Examiner*—Stefan Stoynov
(74) *Attorney, Agent, or Firm*—Duane Morris, LLP

(57) ABSTRACT

An apparatus and method are disclosed or producing a network of composite clocks with optimized stability characteristics from individual clocks that are part of a network wherein not all clocks are in communication with each other. By communicating information among the clocks in the network, each clock can construct its best estimate of composite time based upon all clocks in the network. The clocks that do not directly communicate with a specific clock are partitioned into disjoint groups for which the interclock measurements are compressed by a neighboring clock into a single composite clock. Each clock measures its time against the raw time of the clocks with which it is in direct communication and also inputs to its filter correction data for each of these composite clocks. The composite clock algorithm employed is dependent on the stability characteristics of the clocks in the network.

4 Claims, 3 Drawing Sheets

OPTIMUM STABLE COMPOSITE CLOCK NETWORK

TECHNICAL FIELD

The present invention relates to composite clocks, and more particularly to a network of composite clocks whose outputs are combined to produce an optimum stable composite clock at each node in the network.

The invention has particular application to the Global Positioning System ("GPS") where stable clock references are required by a plurality of satellites, wherein the satellites communicate with their nearest neighbors but not with all satellites in the system.

BACKGROUND

The Global Positioning System has become very valuable for communication, navigation and for geolocation. The GPS system includes about twenty-four spacecraft in 12-hour orbits at about 11000 nautical miles above the Earth. Each spacecraft includes a precision clock and a signal transmitter. A GPS receiver receives signals from several GPS spacecraft and measures the time of emission of the signal from each spacecraft. It then uses this information, together with knowledge of the location of the GPS satellites derived from the GPS signal, to calculate its own geolocation and time. Navigation systems exploit this knowledge to control vehicles and to target weapons. The GPS system also supports the synchronization of network systems such as communication systems.

One important aspect of GPS performance is the ability to predict each GPS space vehicle's ("SV") position and clock state, as the broadcast message from each SV, which GPS users rely on to locate themselves, is based upon prediction. The dominant error in the range prediction error is the instability of the SV's clock. By enhancing the stability of each SV's clock, range prediction errors are reduced and the accuracy of the GPS system is improved.

A clock includes a periodic process and a counter. A simple clock produces a number in a register, which number corresponds to how many counts or how many periodic events have taken place since the clock was initialized. Most physical processes are not perfectly regular in time due to small physical noise processes that vary over time. Hence, clocks will deviate from "perfect" time, and the difference between absolute time and time measured by a clock will behave as a random process and the variation of the error will grow with time.

Prior to 1990, the GPS Master Control Station (GPS MCS) employed a "master clock" for time keeping. In the master clock implementation, a single clock is used to define time, and all other clocks are synchronized to the master clock through tracking these clocks from ground stations. Due to random variations and anomalies in the master clock, the master clock concept had its vulnerabilities. One source of these vulnerabilities of the GPS system is the necessity to keep GPS time close to coordinated universal time (UTC) time, which is Greenwich Mean Time updated with leap seconds. When the difference between the master clock and UTC became too large, then it was necessary to switch the master clock function from one clock to another. Changing the master clock introduced a discontinuity into the GPS service. The discontinuity disrupted service to those receivers that were in operation at the time of the discontinuity.

Since 1990, a composite clock, known as the Implicit Ensemble Mean (IEM), has replaced the master clock arrangement for GPS operations. The IEM composite clock uses a weighted linear combination of clocks, located both in space and on the ground to define "GPS time." The IEM composite clock decreases the sensitivity of GPS time to the behavior of single clocks. The IEM composite clock applies weights associated with space and frequency estimates provided by a Kalman filter that solves for position of the GPS satellite in addition to solving for the clock states of the individual clocks. By changing the weights or contributions of the various clocks to GPS time, the GPS time can be gradually steered to UTC time without significant discontinuities. K. Brown, the developer of the IEM concept of "composite clock", also points out that composite clocks provide better timing and geolocation accuracy than a master clock. Kenneth Brown, "The Theory of GPS Composite Clock", Proceedings of $4^{th}$ International Technical Meeting of the Satellite Division of the Institute of Navigation, Albuquerque, N. Mex., Sep. 11-13, 1991. Thus, by using a composite clock, the accuracy with which users determine their locations has improved. The argument for improved timing accuracy is that, if each clock is off by a random error, then averaging a group of clocks produces a more accurate estimation of time.

The IEM clock embedded within a filter as described by Brown assumes proportional process noise covariances. In this case, clocks have similarly shaped stability curves as a function of sample time.

The applicant's prior disclosure, entitled Stable Composite Clock, U.S. patent application Ser. No. 10/967,405 treats the case where not all clocks in a composite clock system have similarly shaped stability curves. That disclosure proposed applying Kalman filtering techniques to separate out phase and frequency clock noise contributions and produce a composite clock by combining these components into a composite clock frequency and phase, using different weights for the phase and frequency components. A special Kalman filter that solves for all clocks was disclosed. Inputs to this Kalman filter include the parameters that characterize Allan variance curves for all the individual clocks.

Both the IEM clock and the Optimum Stable Clock previously disclosed assume that all clocks are in communication with each other and/or a master clock. In GPS autonavigation, however, not all clocks are in communication with a master clock. Typically, each SV is in contact with about four other SVs. Thus, it is not possible to use existing methods to create a composite clock since all SV clock signals are not easily combined. Thus, a need exists for a method of improving the stability of a plurality of clocks by combining their signals when not all of the clocks are in communication with each other or with any one central clock. Such a method has application not only in the GPS system, but in any network containing multiple clocks wherein optimum clock stability is a critical aspect of the network.

SUMMARY OF THE INVENTION

According to an aspect of the invention, a method is disclosed for producing a network of composite clocks with optimized stability characteristics from individual clocks that are part of a network wherein not all clocks are in communication with each other. By communicating information among the clocks in the network, each clock constructs its best estimate of composite time based upon all clocks in the network. The clocks that do not directly communicate with a specific clock are partitioned into disjoint groups for which the interclock measurements are compressed by a neighboring clock into a single composite clock. Each clock measures its time against the raw time of the clocks with which it is in direct communication and also inputs to its filter correction data for each of these composite clocks.

If all clocks in the network have proportional process noise then a composite clock algorithm such as that employed in the IEM clock is used, whereas if all clocks do not have proportional process noise (whether due to different types of clocks or other factors) a composite clock algorithm in accordance with the applicant's prior disclosure (U.S. patent application Ser. No. 10/967,405) is employed.

BRIEF DESCRIPTION OF THE DRAWINGS

The invention is best understood from the following detailed description when read with the accompanying drawing figures.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

Figure 1:
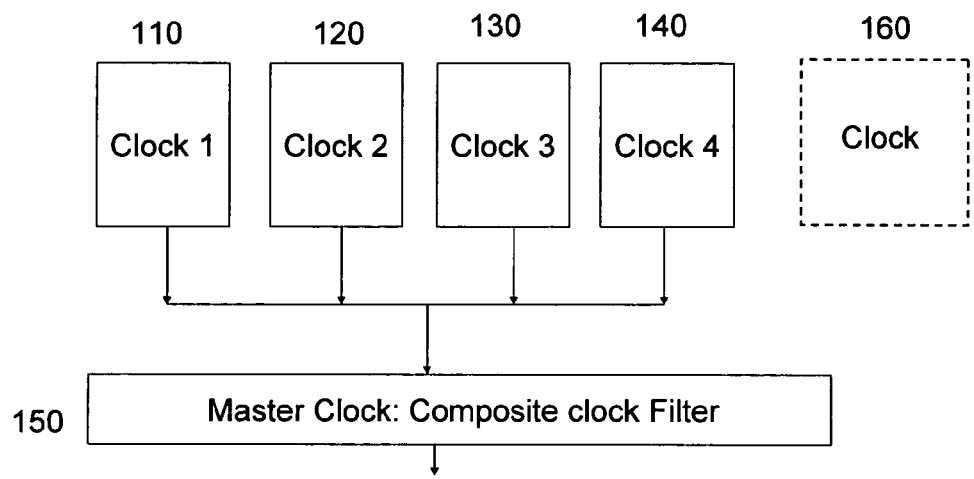
FIG. 1 is a drawing of a prior art four-clock network with a master clock filter.

In FIG. 1, a composite clock system 100 is depicted with four clocks 110, 120, 130 and 140 each connected to a master clock 150. In this system, the master clock is used to drive the composite clock. The output of the master clock is a signal (produced by the master clock) plus a correction to that signal so that composite time can be computed, incorporating readings from clocks 110, 120, 130, 140 and 150. The composite time is constructed by measuring clock differences between individual clocks and the master clock. An example of this would be a tracking station communicating with multiple spacecraft. The composite clock is constructed from a special Kalman filter, as described in U.S. patent application Ser. No. 10/967,405. In the Kalman filter, each clock is represented by two (or more) states, namely phase and frequency. Measurements collected by the composite clock with respect to the other clocks are processed by the filter. Measurements collected by the non-master clocks, for example, measurements between clocks 110 and 120 or measurements of 150 collected by 130, are transmitted to clock 150 (the master clock) to be processed by its master clock filter. Process noise for each clock is also presented as additional inputs to the master clock filter. The composite clock is denoted by the notation C[110, 120, 130, 140|150]. The special designation of 150, which is preceded by the "|" symbol, indicates that clock 150 is the master clock and generates the composite clock with respect to all clocks (including itself). This is a local composite clock and needs to be combined with other local clocks such that the outputs of the filter are corrections to each local lock that can be used to adjust readings from each local clock to local composite time.

Figure 2:
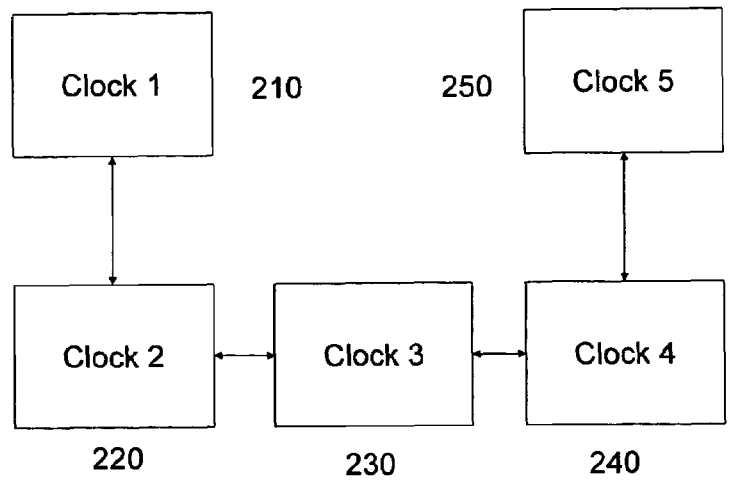
FIG. 2 is a drawing of a five-clock network.

Now suppose the master clock vanishes and individual clocks can take measurements between themselves, as in FIG. 2. An example of this is GPS in the auto-navigation mode. Each node can construct a composite clock based upon its internal clock and measurements of its neighbors' clocks. In FIG. 2 clock 1 (210) can construct a composite clock based upon itself and clock 2 (220); clock 2 can construct a composite clock between itself and clock 1 (210) and clock 3 (230). Clock 3 can construct a composite clock between itself and its neighbors, clock 2 and clock 4 (240). Likewise, clock 4 can construct a composite clock between itself and its neighbors clock 3 and clock 5 (250). Finally, clock 5 can construct a composite clock between itself and its neighbor, clock 4.

Thus, rather than a single composite clock, the network in FIG. 2 produces five local composite clocks, one for each clock in the configuration. In general, each of these local composite clocks will have errors that are correlated. For example, local composite clock 1 will be correlated with local composite clock 3, as they both share clock 2. On the other hand, local composite clock 1 and local composite clock 4 will be uncorrelated as they don't share any clocks in common.

Assuming that the individual clocks in FIG. 1 and FIG. 2 have similar stability characteristics, the composite clock 100 in FIG. 1 is more accurate than any of the composite network clocks in FIG. 2., because the composite clock in FIG. 1 exploits measurements from all five clocks (110, 120, 130,140, and 150). An aspect of the invention is to improve the accuracy of a network of clocks so that every clock in the network utilizes all the clocks in the network. To achieve this, it is necessary for the clocks to exchange more information than local clock measurements. For example, clock 3 (230) in FIG. 2 must also be sent information that includes clocks 1 and 5.

One possible implementation would provide each clock with all the measurements collected by all the clocks. In this case, each clock could generate a composite clock based upon all the measurements. Ignoring the fact there are time-delays, each composite clock would look the same and essentially would be equivalent to a single composite clock, as characterized in FIG. 1. However, there is a problem with this implementation. As the number of nodes increases, the amount of information that needs to be sent, as well as the amount of computation, grows with the number of nodes.

In an exemplary embodiment of the invention a method is developed wherein the composite clock computations are distributed among the nodes so that the amount of computation at a specific node remains fixed, dependent only on the number of nodes in direct communication with that node, and is independent of the total number of nodes in the system. At the basis of the implementation is the notion that a composite clock is an aggregation of clocks into a single clock. For example, the composite clock produced by FIG. 1 is an aggregation of 5 clocks. If this system was connected to another clock, say 160, through a link that involves clock 150, then the correction to clock 150 is all the clock 160 would need to adjust the composite clock measurement comprised of clocks 110, 120,130, 140 and 150 so that that the a master clock by 160 could consider the measurements from the total composite clock C[110, 120, 130, 140|150].

Figure 3:
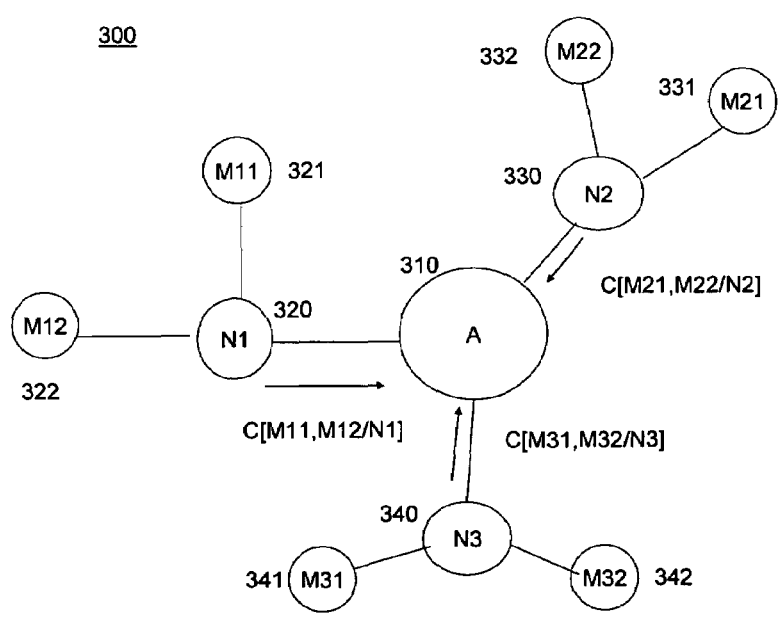
FIG. 3 is a drawing of a ten-clock network.

To apply this concept to a more complex network, consider FIG. 3, which displays a network (300) of clocks, where A (310) represents a specific node. Node A communicates with clocks N1 (320), N2 (330), and N3 (340). Each of these also communicates with its neighbors other than A: clock N1 communicates with clocks M11 (322) and M12 (321); clock N2 communicates with clocks M22 (332) and M21 (331); clock N3 communicates with clocks M32 (342) and M31 (341). Prior art methods show how clock A can construct an estimate of composite time using its neighbors: N1, N2 and N3 (as discussed with FIG. 1). The problem is how to extend composite time at A to include information from clocks M11, M12 etc.

To construct a network composite clock for this example, each clock N1, N2, and N3 constructs a local composite clock with all its neighbors, excluding clock A. Doing this constructs local composite clocks C[M11, M12|N1], C[M21, M22|N2], and C[M31, M32|N3]. Now clock A aggregates these local composite clocks into a global composite clock C[C[M11, M12|N1], C[M21, M22|N2], C[M31, M32 |N3] |A], This latter operation is the notation of applying the local composite clock algorithm to local composite clocks.

What this expression means is that the implementation of a composite clock can be decomposed into the implementation of two clocks: one where a specific clock is the master clock (in this case, A is the master clock and the clocks in this partition are N1, N2, and N3) and another filter that combines the master clock solution with clock A to form the global composite clock involving all clocks, A, N1, N2, and N3. This latter filter only involves modeling two clocks. Hence, the first filter acts as a data compressor, compressing 3 clocks into a single clock.

Now applying this notation to FIG. 3, clock N1, acting as a master clock, compresses all the clocks it talks to (excluding A) into the clock C[M11, M12/N1] and passes this information to clock A. Thus clock A will construct a master clock with 7 clocks: itself, its neighbors (N1, N2, N3) and the composite clocks (C[M11, M12/N1], C[M21, M22/N2] and C[M31, M32/N3].

To support other nodes in the network, A will need to generate separate composite clocks for each of the nodes that it communicates to. Each composite clock will be a synthesis of clocks that are connected to its neighbor via A. For example to support node N1, A must combine clocks C[N2/M21, M22] and C[N3/M31, M32], Thus, in the above example, besides running its own composite clock, node A must support three additional composite clocks.

The same concept applies if the network expands to more layers. However, no matter how many nodes exist, the computation at a specific node only depends upon how many other nodes that mode is directly connected to.

One should note that the composite clock constructed at each node will be different, as each is vulnerable to different random noise in the measurements. For example, clock A will have different measurements of the errors between itself an its neighbors than its neighbors will have of clock A.

To demonstrate the distributed optimum stable composite, measurements were simulated and processed based upon the network of five clocks diagrammed in FIG. 2. In this application, a distributed optimum composite clock will be constructed for clock 3.

The global composite clock for clock 3 (230) is constructed from three composite clocks as follows:
  A. Clock constructed by clock 2 (220), using clock 1 (210) and clock 2 cross-link data;
  B. Clock constructed by clock 4 (240), based upon combining clock 4 and clock 5 (250) cross-link data.
  C. Clock constructed by clock 3 using cross-link data between it and its neighboring clocks; it also uses corrections provided by the neighboring composite clocks: clock 2 provides corrections to its clock and clock 4 provides corrections to its clock.

Figure 4:
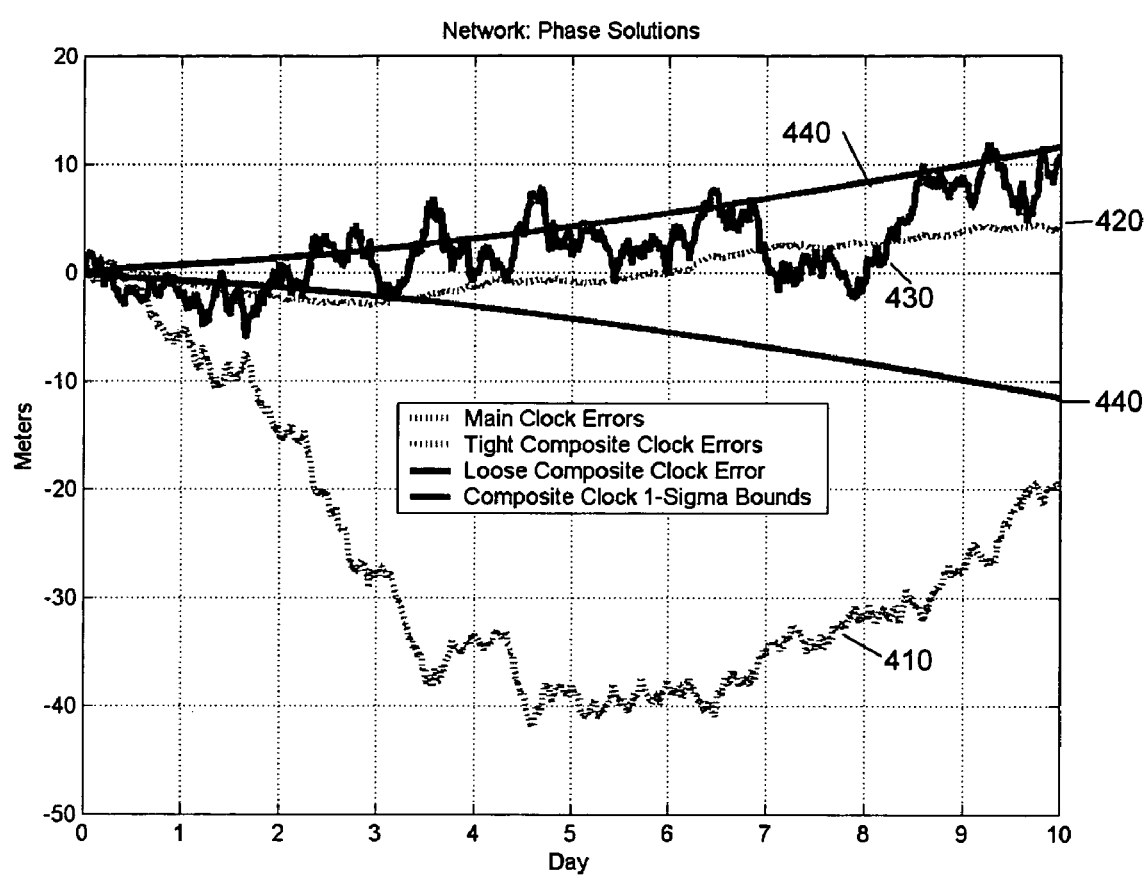
FIG. 4 is a graph of simulation results for a distributed optimum composite clock in a five-clock GPS network.

In the simulation the stability ratios for the different clocks are given by 1:2:4:2:1. Thus, the end clocks are the most stable; the middle clock is the least stable. The impacts of the network optimum stable composite clock on clock 3 will be examined. Tying clock 3 to clocks 2 and 4 using the old algorithm should provide a clock with stability 1.3; expanding the network to include clocks 1 and 5 with the new algorithm should make clock 3 stability have value 0.6. The results of the simulation are presented in FIG. 4. The lowermost curve (410) represents the raw errors of clock 3 (labeled "the main clock errors"). The thick upper curve (430) represents the errors of the distributed optimum stable clock (labeled "loose composite clock errors"). The dashed upper curve (420) represents optimum performance based upon continuous error-free measurements (labeled "tight composite clock errors"). 1-sigma (0.68 p) bounds for the optimum performance are presented as solid straight lines (440), representing the clock stability value of 0.6.

If the variation of the clock performance was ignored, i.e. each SV was equally weighted, the global stability would be a root-mean-square average, or about 2.3. This is almost a factor of 4 worse than the optimized composite clock.

The results show that the distributed composite clock, although more noisy, follows the tight composite clock, providing far better performance than the uncorrected clock, thus demonstrating the utility of the concept of a network optimum stable composite clock.

In the simulations, cross-ranging measurements are simulated every 15 minutes with 10 cm random errors. The main-clock (clock 3) composite clock filter uses predicted output from the other filters as nominal values and solves for correction to these outputs using as an model the optimum stable process noise parameters for that clock. As noted above, the outputs of a loose composite clock are noisier than an optimum stable clock. Thus, to compensate for this additional noise, it is necessary to tune the random noise parameters in the filter so that the root-mean-square value of the predicted residuals matched the covariance computed by the filter (a common prior art method of tuning common filters). If the actual root-mean-square value of the predicted residuals is larger than the predicted covariance, the filter covariance of the measurement errors is increased, and vice versa. Based upon smoothed residuals, the random noise was increased to 16.5 cm on all cross-link measurements for all filters.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:
1. A clock network comprising:
  a plurality of individual clock nodes, (310, 320 . . . 342) each individual clock node comprising a communications device and a clock producing a clock signal, wherein each of the individual clock nodes (e.g. 310) receives clock information from at least one other individual clock node in the clock network (e.g. 320) via a direct communication link; and each of the individual clock nodes receives clock information for each of the clock nodes, (e.g. 331) with which it does not have a direct communication link, via other individual clock nodes, (e.g. 330) where a first individual clock node (310) constructs a composite clock by using the clock at that node as a master clock in combination with readings and composite clock data from transmitting clock nodes (320, 330 and 340) with which the first individual clock node is in direct communication.

2. The clock network of claim 1 wherein said readings are uncorrected clock signal measurements.

3. The clock network of claim 2 wherein said composite clock data is correction data resulting from the calculation of a local composite clock for each transmitting clock node (320, 330 and 340) with which the first individual clock node (310) is in direct communication.

4. The clock network of claim 3 wherein said local composite clock (e.g. for node 320) is constructed with clock measurements and data from all clocks with which the transmitting clock node is in direct communication (321 and 322) except the clock to which the transmitting clock node (310) is transmitting.

* * * * *